(12) United States Patent
Zhang et al.

(10) Patent No.: US 11,155,239 B2
(45) Date of Patent: *Oct. 26, 2021

(54) METHOD AND SYSTEM FOR MANAGING ACCESS OF VEHICLE COMPARTMENT

(71) Applicant: Beijing Voyager Technology Co., Ltd., Beijing (CN)

(72) Inventors: Jiang Zhang, San Jose, CA (US); Fengmin Gong, Los Gatos, CA (US); Xiaoyong Yi, Fremont, CA (US); Qi Chen, Burlingame, CA (US); Yu Wang, San Jose, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 19 days.

This patent is subject to a terminal disclaimer.

(21) Appl. No.: 16/659,313

(22) Filed: Oct. 21, 2019

(65) Prior Publication Data
US 2020/0223395 A1 Jul. 16, 2020

Related U.S. Application Data

(63) Continuation of application No. 16/192,569, filed on Nov. 15, 2018, now Pat. No. 10,464,529.

(51) Int. Cl.
*B60R 25/24* (2013.01)
*B60R 25/01* (2013.01)

(52) U.S. Cl.
CPC ............ *B60R 25/241* (2013.01); *B60R 25/01* (2013.01)

(58) Field of Classification Search
CPC .............................. B60R 25/241; B60R 25/01

USPC ......................................................... 701/49
See application file for complete search history.

(56) References Cited

U.S. PATENT DOCUMENTS

| 10,464,529 B1* | 11/2019 | Zhang ................ G07C 9/00309 |
| 2009/0153295 A1 | 6/2009 | Hamada |
| 2010/0071424 A1* | 3/2010 | Tsuruta ................... E05B 83/30 70/91 |
| 2013/0227650 A1* | 8/2013 | Miyake ................... H04L 63/08 726/3 |
| 2016/0371481 A1* | 12/2016 | Miyake ............... H04L 63/0846 |
| 2018/0154867 A1* | 6/2018 | Golduber ............... G07B 15/00 |

FOREIGN PATENT DOCUMENTS

| CN | 103029680 A | 4/2013 |
| DE | 102014004673 A1 | 10/2015 |
| DE | 102015205300 A1 | 9/2016 |

(Continued)

OTHER PUBLICATIONS

Ex Parte Quayle for U.S. Appl. No. 16/192,569, dated Aug. 12, 2019, 10 pages.

(Continued)

*Primary Examiner* — Gertrude Arthur Jeanglaude
(74) *Attorney, Agent, or Firm* — Kilpatrick Townsend & Stockton LLP

(57) ABSTRACT

Methods and systems for improving security of a vehicle are disclosed. In one embodiment, a method comprises receiving, from a requester, a request to access a vehicle compartment of a vehicle; determining a scope of access of the vehicle compartment for the requester based on an operation of the vehicle; and configuring a lock mechanism of the vehicle compartment based on the scope of access.

10 Claims, 11 Drawing Sheets

(56) References Cited

FOREIGN PATENT DOCUMENTS

| | | |
|---|---|---|
| DE | 102016222541 A1 | 5/2018 |
| JP | 2006206225 A | 8/2006 |
| WO | 2016054271 A1 | 4/2016 |

OTHER PUBLICATIONS

Notice of Allowance for U.S. Appl. No. 16/192,569, dated Aug. 29, 2019, 5 pages.
Extended European Search Report for EP18880054.4, dated Nov. 8, 2019, 7 pages.
Office Action for EP 18880054.4, dated Sep. 22, 2020, 5 pages.
International Preliminary Report on Patentability for PCT/US2018/064594, dated May 27, 2021, 7 pages.
International Search Report and Written Opinion for PCT/US2018/064594, dated Feb. 1, 2019, 9 pages.

* cited by examiner

METHOD AND SYSTEM FOR MANAGING ACCESS OF VEHICLE COMPARTMENT

CROSS REFERENCES TO RELATED APPLICATIONS

This application is a continuation of U.S. Non-Provisional patent application Ser. No. 16/192,569, filed Nov. 15, 2018 and titled "METHOD AND SYSTEM FOR MANAGING ACCESS OF VEHICLE COMPARTMENT," the disclosure of which is herein incorporated by reference in its entirety for all purposes.

BACKGROUND

Modern vehicles include many components, such as an engine and transmission, as well as electronic circuits such as sensors and processing modules, LiDAR modules, electronic control modules, etc. Many of these components are housed within a vehicle compartment. The vehicle compartment typically has a movable cover, such as a hood or a door, which can be opened when an actuator (e.g., a physical button, a software button, etc.) is activated to provide access to the components housed within the vehicle compartment. Under normal operation (e.g., when the vehicle is moving), the vehicle compartment is locked such that the movable cover remains closed even when the actuator is activated. When the vehicle is stationary, a user (e.g., a driver, a passenger, a technician, or any person who has access to the cabin) can unlock the vehicle compartment from within the cabin to access the interior of the vehicle compartment.

Typically, a person who can gain entry into the cabin has full, unlimited access to the vehicle compartment. Such arrangements, however, can create security risks. For example, an intruder may break into the passenger cabin and gain access to the vehicle compartment. Also, in the context of ridesharing and autonomous driving, a passenger of an autonomous vehicle can gain access to the vehicle compartment in the absence of the owner of the vehicle being present. In both cases, the components housed within the vehicle compartment can be subject to unauthorized access, which can compromise the security of the vehicle. On the other hand, restricting access to the vehicle compartment can create inconvenience for maintenance work on the vehicle.

BRIEF SUMMARY

In certain embodiments, a method is provided. The method comprises receiving, from a requester, a request to access a vehicle compartment of a vehicle; determining a scope of access of the vehicle compartment for the requester based on an operation of the vehicle; and configuring a lock mechanism of the vehicle compartment based on the scope of access.

In some aspects, the scope of access of the compartment comprises one of: no access to the vehicle compartment, one-time temporary access to the vehicle compartment, or unlimited access to the vehicle compartment.

In some aspects, the scope of access is determined based on whether the requester has performed a check-in process at a management server, the check-in process comprising the requester providing credential information to authenticate that the requester is a privileged user. In some aspects, the method further comprises: providing no access to the vehicle compartment for the requester based on determining that the requester has not performed the check-in process at the management server. In some aspects, the method further comprises: receiving, by an access control module of the vehicle and from the management server, a check-in notification, the check-in notification further including an indication of the scope of access of the vehicle compartment; and configuring the lock mechanism of the vehicle compartment based on the indication.

In some aspects, the method further comprises: receiving, by a trusted entity and from the requester, the request to access the vehicle compartment; granting, by the trusted entity, the request based on information about an event of the vehicle; transmitting, by the trusted entity to a management server, a command to provide access of the vehicle compartment; transmitting, by the management server to an access control module of the vehicle, an access token, the access token including an indication of the scope of access of the vehicle compartment; and responsive to receiving the access token, disabling, by the access control module, the lock mechanism based on the indication. In some aspects, the request includes a vehicle identifier of the vehicle and a requester identifier of the requester. The access token includes the vehicle identifier of the vehicle and the requester identifier.

In some aspects, the scope of access includes an expiration time of the access token. The disabling of the lock mechanism by the access control module is based on a current time preceding the expiration time. In some aspects, the scope of access includes a sequence number. The disabling of the lock mechanism by the access control module is based on the sequence number being higher than a reference sequence number stored at the access control module. The method further includes updating the reference sequence number based on the sequence number after the lock mechanism is enabled.

In some aspects, the access token includes a vehicle identifier. The disabling of the lock mechanism by the access control module is based on the vehicle identifier of the access token matching a reference vehicle identifier of the vehicle.

In some aspects, the method further comprises transmitting, by a management server to an access control module, an access token indicating the scope of access. The access token is signed by a private management key of the management server. The method further comprises verifying, by the access control module, a signature of the access token using a public management key of the management server.

In some aspects, the access token is also encrypted by a public key of the access control module. The method further comprises decrypting, by the access control module, the access token using a private key of the access control module after verifying the signature.

In some aspects, the method further comprises: responsive to denying access to the vehicle compartment for the requester, monitoring for unauthorized access to the vehicle compartment; and responsive to detecting the unauthorized access, performing one or more operations. In some aspects, the monitoring for unauthorized access to the vehicle compartment is based on at least one of: a detection of motion of a movable cover of the vehicle compartment, a detection of motion of one or more components housed with the vehicle compartment, or a detection of light intensity change with the vehicle compartment. In some aspects, the one or more operations include: outputting an alarm signal, transmitting a signal to law enforcement, or transmitting a signal to the management server.

In certain embodiments, an apparatus is provided. The apparatus includes a memory that stores a set of instructions and a hardware processor configured to execute the set of instructions to: receive, from a requester, a request to access a vehicle compartment of a vehicle; determine a scope of access of the vehicle compartment for the requester based on an operation of the vehicle; and configure a lock mechanism of the vehicle compartment based on the scope of access.

In some aspects, the hardware processor is configured to execute the set of instructions to determine the scope of access based on whether the requester has performed a check-in process at a management server, the check-in process comprising the requester providing credential information to authenticate that the requester is a privileged user.

In some aspects, the hardware processor is configured to execute the set of instructions to: receive an access token from a management server, the access token including an indication of the scope of access of the vehicle compartment and is transmitted by the management server based on a command from a trusted entity; and responsive to receiving the access token, disable the lock mechanism based on the indication.

In certain embodiments, a non-transitory computer readable medium is provided. The non-transitory computer readable medium stores instructions that, when executed by a hardware processor, causes the hardware processor to perform the aforementioned method. For example, the hardware processor may receive, from a requester, a request to access a vehicle compartment of a vehicle; determine a scope of access of the vehicle compartment for the requester based on an operation of the vehicle; and configure a lock mechanism of the vehicle compartment based on the scope of access. In some aspects, the hardware processor may receive an access token from a management server, the access token including an indication of the scope of access of the vehicle compartment and is transmitted by the management server based on a command from a trusted entity; and responsive to receiving the access token, disable the lock mechanism based on the indication.

BRIEF DESCRIPTION OF THE DRAWINGS

The detailed description is set forth with reference to the accompanying figures.

DETAILED DESCRIPTION

Figure 1:
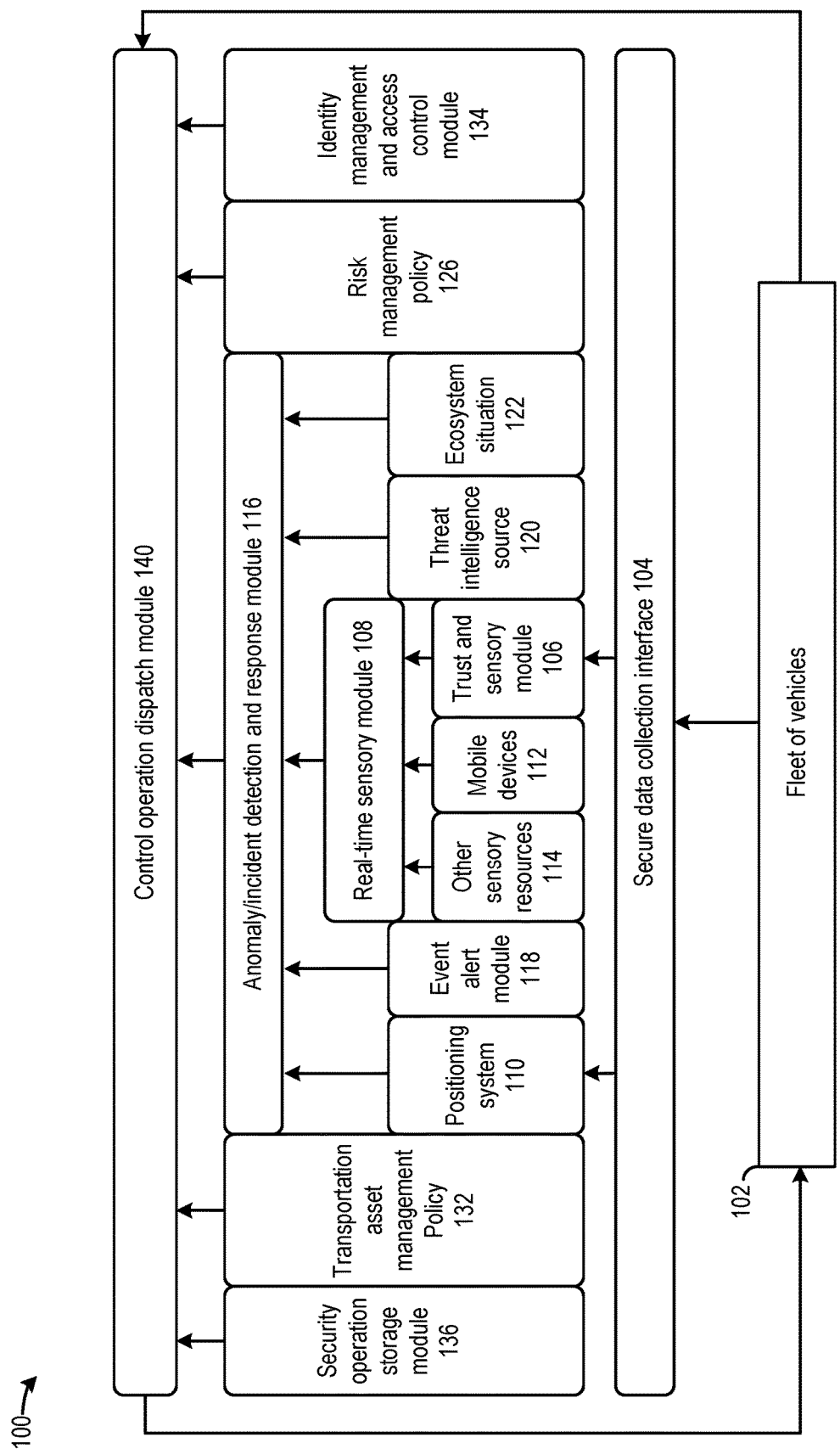
FIG. 1 shows a security and safety platform utilizing certain embodiments of the disclosed techniques described herein.

Aspects of the present disclosure relate generally to peripheral devices, and in particular to a wireless peripheral device controller, according to certain examples.

In the following description, various examples of a vehicle security system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Securing a vehicle compartment can be crucial in enhancing security and safety protection for the entire vehicle. As described above, the vehicle compartment may house critical mechanical and electronic components. Securing the vehicle compartment can prevent unauthorized access to those components, which would otherwise compromise the security and safety of the vehicle. For example, the electronic components in the vehicle compartment may be connected to other electronic components (e.g., the infotainment system, the navigation system, etc.) of the vehicle via a Controller Area Network (CAN bus). A malicious passenger can access the vehicle compartment and tamper with the electronic components (e.g., electronic control units (ECU)) within the vehicle to perform an attack to the other electronic components over the CAN bus. For example, the malicious passenger can send commands to the ECU to control the vehicle. As another example, the malicious passenger can modify a record of usage of the vehicle or gain access to other services provided by the vehicle, which the user is not authorized to access, etc., by tampering with the ECU. As another example, a malicious passenger can tamper with the autonomous driving (AD) control system housed within the vehicle compartment, which can compromise the safe operation of the vehicle.

In some embodiments, these types of security and safety risks may be mitigated by restricting access to a lock mechanism of the vehicle compartment. For example, an unlocking operation may be limited to situations where the owner is physically with the vehicle or the vehicle is at the owner's premises. However, such arrangements can be inconvenient for third parties that have a legitimate need to access the vehicle without the owner being present. For example, the vehicle may have been towed to a repair shop without the owner being physically present. In such a scenario, the service person may be unable to open the movable cover and gain access to the vehicle compartment to perform the necessary repair work.

Conceptual Overview of Certain Embodiments

Examples of the present disclosure relate to a vehicle compartment security system that can address the problems described above. The vehicle compartment security system includes an access control module (ACM) at a vehicle, such as ACM 242 of FIG. 2, and a remote management server, such as management server 302 of FIG. 2. The ACM is coupled with a lock mechanism of a vehicle compartment. The ACM can receive a request to access the vehicle compartment by a requester. Based on an operation condition including, for example, whether the vehicle is activated by a check-in process performed by the requester, whether the requester is a privileged user who has full and unlimited access to the vehicle compartment, whether a temporary unlock instruction (e.g., a temporary access token) is received by the ACM, etc., the ACM can determine a scope of access of the vehicle compartment for the requester. The scope of access may include, for example, denial of access, full and unlimited access, a one-time temporary access with an expiration time, etc. The ACM can configure the lock mechanism (e.g., to enable or disable it) to provide the requester with access to the compartment according to the scope of access. In some cases, the ACM may determine the operation condition based on information provided by the remote management server.

The vehicle compartment security system can adapt the access scope of a vehicle compartment for different scenarios. As an illustrative example, the requester may be a repair person seeking to gain access to a vehicle compartment of a vehicle towed to a repair shop. The repair person may transmit a request to a customer service server operated by a trusted entity (e.g., a company, a person, etc.) to access the compartment. Upon independently verifying that the request is legitimate (e.g., based on an event log which indicates the vehicle is in the possession of the repair person or entity), the customer service server can transmit an instruction to the management server to grant the request. The management server can transmit an unlock instruction (e.g., an access token) to the ACM. The unlock instruction can include an unlimited access token or a temporary access token. Upon receiving the unlock instruction from the management server, the ACM can disable the lock mechanism, which allows the repair person to open the movable cover and access the interior of the vehicle compartment to perform maintenance work. The disabling operation of the lock mechanism can be determined based on whether an unlimited access token or a temporary access token is received.

As a second example, the ACM may lose long-range communication (e.g., cellular communication) with the management server, but the ACM can communicate with a mobile device of the requester via short-range communication (e.g., Bluetooth, Near Field Communication (NFC)), etc., to accept a limited access request from the requester. The limited access request may include a temporary access token, which indicates a limited scope of access. The limited scope of access may include, for example, the access being one-time only, being time-limited, etc. The requester (and the mobile device) may have received the temporary access token from the management server, via long-range communication that is not available to the ACM. One example scenario is when the vehicle is at a repair center where the cellular signal is very weak and the vehicle cannot connect to the server (e.g., the repair center being at the basement). A requester (e.g., the repair person) can use his mobile phone to obtain the temporary access token using Wi-Fi connection, or when at a spot where the cellular reception is strong. The requester can then go back to the vehicle to transmit the access token to the vehicle via short-range communication. Upon receiving the temporary access token from the mobile device and verifying that the temporary access token is generated by the management server, the ACM can disable the lock mechanism. In some example, the ACM can disable the lock mechanism for a duration indicated by the expiration time. In some example, the ACM can limit a number of times the lock mechanisms can be disabled (after being enabled). In both cases, temporary and limited access to the vehicle compartment can be provided.

As another example, the ACM may determine that a requester is a privileged user, and configure the locking mechanism to provide the requester with full and unlimited access of the vehicle compartment. The requester may be, for example, an owner of the vehicle, a manager of the vehicle, etc. There are different ways by which the ACM may determine that a requester is a privileged user. In one example, the vehicle security system may detect that the requester has activated the vehicle by a check-in process (e.g., by providing the requester's credential to authenticate himself/herself as a privileged user) with the management server, which can send, to the ACM, a check-in notification together with an indication that the person who performs the check-in is a privileged user. Based on receiving the check-in notification and the privilege indication, the ACM can disable the lock mechanism to provide full and unlimited access of the vehicle compartment. In another example, ACM (or other components of the vehicle) can store a list of privileged users and their credentials. A user can perform the check-in process at the vehicle and provide his/her credentials to allow the ACM to authenticate the user as a privilege user, and to provide the authenticated user with full and unlimited access of the vehicle compartment.

With embodiments of the present disclosure, a vehicle compartment security system can take into account various operation conditions to set a scope of access to the vehicle compartment. For instance, the vehicle security system may allow access to be provided in situations where a security risk is low and the need for accessing the compartment exists (e.g., in a repair shop, by a privileged person, etc.). Moreover, the vehicle security system can rely on a separate interaction between a remote management server (which can optionally interface with a customer service server operated by a trusted entity) and the requester to confirm that the requested access poses little security risk, which can minimize the risk of allowing a malicious user or intruder access to the compartment. All these allow the vehicle compartment to be accessed when there is a justified need, while reducing the security risk posed to the vehicle.

Typical System Environment for Certain Embodiments

FIG. 1 illustrates a security and safety platform 100 in which the disclosed techniques can be implemented. Security and safety platform 100 can manage the security and safety of a fleet of vehicles, including fleet of vehicles 102. Security and safety platform 100 can collect various operation data of fleet of vehicles 102, as well as environment data from other sources related to an environment in which the fleet of vehicles operate. Security and safety platform 100 can process the data to detect and respond incidents/anomalies, and determine a corresponding risk scenario. Security and safety platform 100 can then determine one or more control operations based on the risk scenario. Security and safety platform 100 can also take into account other information such as management policies, pre-configured security operations, access control rules, etc., to formulate the control operations. Security and safety platform 100 can then dispatch instructions to fleet of vehicles 102 to perform the control operations to mitigate the risk. Fleet of vehicles 102 can include various types of vehicles operating in different operation environments and providing different services. For example, fleet of vehicles 102 can include vehicles that provide private transportation, public transportation, ride-sharing, etc. Fleet of vehicles 102 can include autonomous driving (AD) vehicles, manually-driven vehicles, etc.

Security and safety platform 100 can further include a secure data collection interface 104 to collect various operation data from fleet of vehicles 102. The operation data may include, for example, location data, speed data, sensor data (e.g., sensor data from a cabin door sensor, a hood sensor, tire pressure sensors, etc.), status data from various electronic components of the vehicles, etc. To protect privacy and to avoid the operation data from being intercepted, secure data collection interface 104 can establish a secure wireless channel with each vehicle of the fleet, and receive, in real-time, the operation data from the vehicles via the secure wireless channels. Security and safety platform 100 further includes a trust and sensory module 106 which can provide the credential information (e.g., public key certificate, etc.) to perform mutual authentication with fleet of vehicles 102 to authenticate security and safety platform 100 and to establish the secure wireless channels with secure data collection interface 104. Trust and sensory module 106 can also perform certain post-processing operations on the real-time operation data, such as identifying the vehicles and the sensors that provide the sensor data, extracting the time information, etc., from the real-time operation data, and provide the post-processed real-time operation data to a real-time sensory module 108. The location and speed data from secure data collection interface 104 can also be processed by positioning system 110 to generate and/or update position information of each vehicle of fleet of vehicles 102. As to be described below, the position information of the vehicles can be correlated with other aspects of the real-time operation data provided by the vehicle to detect safety and/or security risks.

In addition to the real-time operation data from fleet of vehicles 102 (provided by trust and sensory module 106), real time sensory module 108 can also obtain real-time environment data related to the environment(s) in which the fleet of vehicles operate in. As shown in FIG. 1, the real-time environment data can be obtained from mobile devices 112 and other sensory resources 114, among others. The real-time environment data may include, for example, reports provided by mobile devices 112, which can be operated by the passengers of fleet of vehicles 102, other road users, pedestrians, repair service personnel, etc. The reports may include, for example, traffic condition reports, road condition reports (e.g., whether a road is closed or otherwise not suitable for driving), etc. Mobile devices 112 can also transmit access requests to access certain features and resources of fleet of vehicles 102 by the passengers, the repair service personnel, etc. In addition, other sensory resources 114 may include fixed and/or mobile sensors installed as part of a city infrastructure to provide environment sensory data including, for example, weather conditions, traffic conditions, etc. Real-time sensory module 108 can provide the real-time environment data (e.g., reports from mobile devices 112, environment sensory data from other sensory resources 114, etc.) as well as the real-time operation data (from trust and sensory module 106) to anomaly/incident detection module and response 116, which may also be configured to receive position information of fleet of vehicles 102 from positioning system 110. In some embodiments, real-time sensory module 108 can be configured to receive real time data, the real-time environment data, and the real-time operation data (including the position information) to detect safety and/or security risks.

In addition to real-time environment data and real-time operation data, anomaly/incident detection and response module 116 can receive additional information/data from other sources to perform safety and/or security risks detection, and to provide response. For example, anomaly/incident detection and response module 116 can receive alerts/reports about certain public events (which can be pre-planned, or based on real-time reporting, such as hazardous weather conditions, traffic accidents, etc.) at different locations and times from event alert module 118, and provide a response. Anomaly/incident detection and response module 116 can also monitor network activities and detect potential cyber security attacks. Anomaly/incident detection and response module 116 can also receive, from threat intelligence source 120, warnings of potential security threats, such as potential criminal, terrorist, or other hostile actions, at different locations and times. In addition, ecosystem situation 122 may also provide, for example, environment and operation data from other fleets of vehicles operated by other vendors. All these data can be integrated by anomaly/incident detection and response module 116 to perform safety and/or security risks detection and response.

Anomaly/incident detection and response module 116 can include logic to analyze the real-time environment data and real-time operation data (from real-time sensory module 108), position information of fleet of vehicles 102 (from positioning system 110), public events alerts/reports (from event alert module 118), warnings of potential security threats (from threat intelligence source 120), and ecosystem data (from ecosystem situation 122), and identify potential safety and/or security risks. The analysis can be based on, for example, correlating operation data with time and location information of fleet of vehicles 102, detecting patterns of operations, etc., while taking into consideration warnings and alerts about known events and threats. Anomaly/incident detection and response module 116 can also generate a risk assessment including, for example, an identification of the safety and/or security risk, time and location of the risk, severity of the risk, etc., and send the result of the analysis to control operation dispatch module 140.

As an illustrative example, real-time sensory module 108 may receive sensor data from a vehicle of fleet of vehicles 102. The sensor data may be generated by a sensor at a vehicle compartment which houses the electronic control unit (ECU) of the vehicle. Anomaly/incident detection and response module 116 may receive the sensor data from real-time sensory module 108, and determine that there is a current (or at a certain pre-determined time) attempt to access the vehicle compartment. Anomaly/incident detection and response module 116 may determine whether such an event indicates a potential security or safety risk. To make the determination, anomaly/incident detection module 116 may obtain additional data from other sources, such as position system 110, threat intelligence source 120, etc., as well as login data and access request provided by users who try to access vehicles 102, and correlate the additional data with the event. For example, anomaly/incident detection module 116 may determine, based on position information of the vehicle from positioning system 110, whether the vehicle is at a location where the compartment door is not expected to be opened. If the position information indicates that vehicle is at a repair shop, at the vehicle owner's premise, etc., at the time when the attempt to access the compartment door is detected, and a temporary access request to a vehicle compartment is received, anomaly/incident detection and response module 116 may determine that the attempted access does not pose a security risk and may grant access to the vehicle compartment. As another example, if the information provided by threat intelligence source 120, together with the position information from positioning system 110, indicate that the vehicle is located in an area where car theft is rampant, and an access attempt from a user who has no access right to the vehicle compartment is detected, anomaly/incident detection and response module 116 may determine that the attempted access poses a heightened security risk and can provide an appropriate response (e.g., by disabling the access to the vehicle compartment, by issuing an alert to law enforcement, etc.)

Control operation dispatch module 140 can receive the risk assessment (e.g., the identified risk, a severity of the risk, etc.) for a vehicle from anomaly/incident detection module 116, and determine an action to be performed at the vehicle to mitigate a safety/security risk based on the risk assessment. The determination can be based on applying a set of rules to the identified risk and the severity of the risk, and the rules can come from various sources. For example, as shown in FIG. 1, control operation dispatch module 140 can receive rules defined in risk management policy storage 126 and transportation asset management policy storage 132, and apply the rules to determine the action. Referring back to the vehicle compartment access example above, transportation asset management policy storage 132 may provide rules that specify that the compartment of a vehicle stores critical electronic components, and authorization is needed before granting access to the compartment. Risk management policy storage 126 can define a set of operations to determine whether to authorize access to the compartment (e.g., requesting credential information from the requester). For example, in a case where the requester for the vehicle compartment access is a registered user (e.g., a driver, a passenger, etc.) of fleet of vehicles 102, control operation dispatch module 140 can operate with an identity management and access control module 134 to authenticate the identity of the requester, and to determine the access right of the requester with respect to the vehicle compartment. In cases where anomaly/incident detection module 116 determines that the severity of a risk is high, control operation dispatch module 140 can perform security operations based on definitions stored in a security operation storage 136 to mitigate the security risk. For example, threat intelligence source 120 may indicate that there is high likelihood that the entire fleet of vehicles 102 may be under cyberattack. Security operations storage 136 may define that control operation dispatch module 140 should disable the passengers access to the Internet for each vehicle of the fleet (while maintaining the network connection between the vehicles and security and safety platform 100) when the risk of cyberattack is high. Control operation dispatch module 140 can then configure (or send instructions to) fleet of vehicles 102 to disable Internet access for the passengers.

Figure 2:
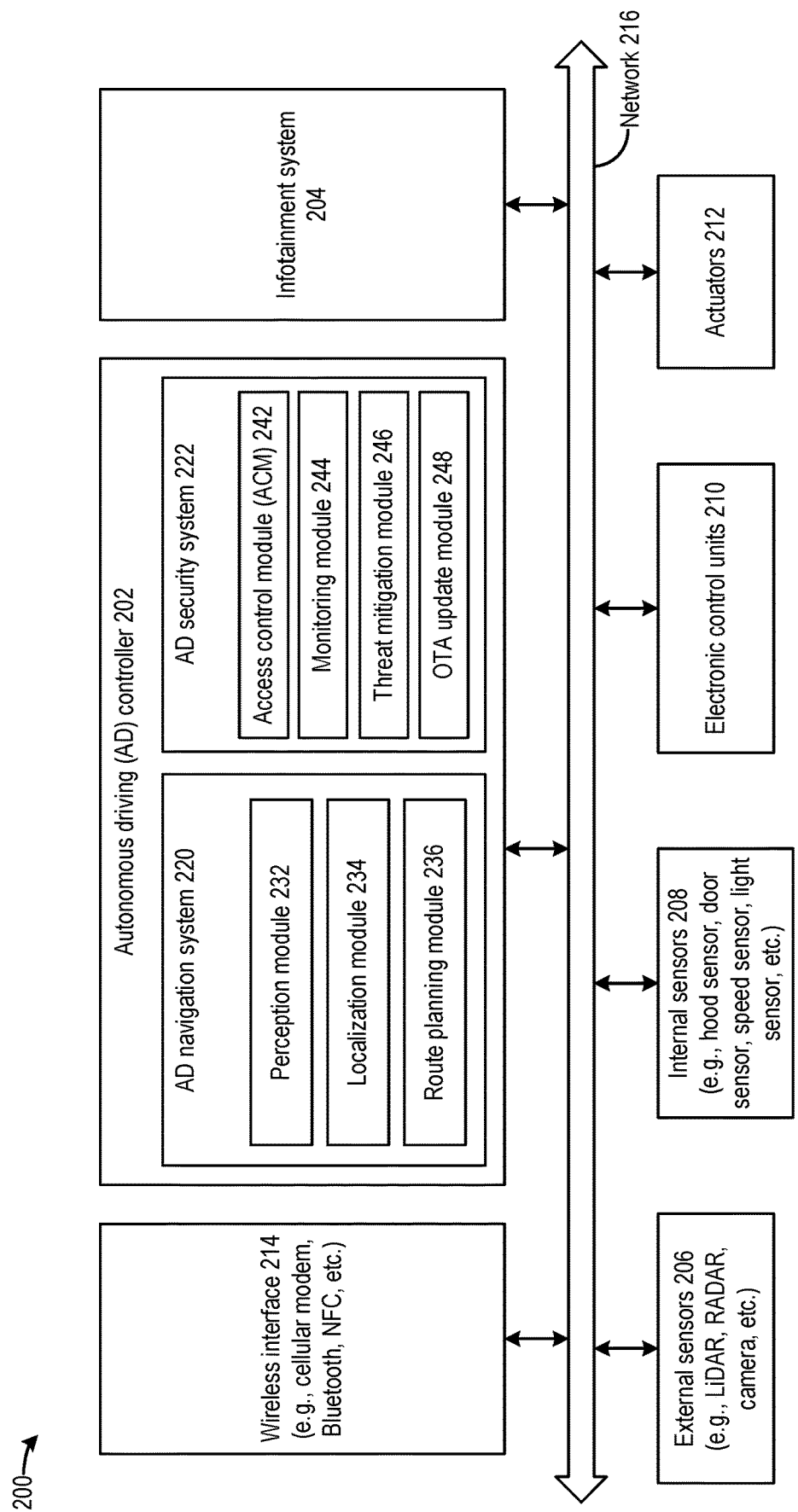
FIG. 2 illustrates a block diagram of an example of a vehicle electronic system in which the disclosed techniques can be implemented, according to certain embodiments.

FIG. 2 illustrates a block diagram of an example of a vehicle electronic system 200 in which the disclosed techniques can be implemented. Vehicle electronic system 200 can be part of security and safety platform 100 of FIG. 1. Vehicle electronic system 200 can also be part of an autonomous driving (AD) vehicle and can include various electronic components including, for example, an AD controller 202, an infotainment system 204, external sensors 206, internal sensors 208, a plurality of electronic control units (ECU) 210, a plurality of actuators 212, and a wireless interface 214. The electronic components are coupled to network 216. Via network 216, the electronic components can communicate with each other. In some examples, network 216 can include a CAN bus. In some examples, some of the components can also be connected directly and not via network 216. For example, external sensors 206, internal sensors 208, and actuators 212 connected directly to AD controller 202, so that AD controller 202 can detect and control unauthorized access to the vehicle even when network 216 is not working.

AD controller 202 can include components to support various operations related to autonomous driving including, for example, navigation and control, security and protection, etc. In some embodiments, the modules and subsystems of AD controller 202 can be implemented in the form of software instructions executable on a general purpose computer. In some embodiments, the modules and subsystems of AD controller 202 can be implemented on an integrated circuit (IC) such as Application Specific Integrated Circuit (ASIC), field-programmable gate array (FPGA), System-on-Chip (SoC), etc. In some embodiments, AD controller 202 can include AD navigation subsystem 220 and AD security subsystem 222. AD navigation subsystem 220 can obtain sensor data from external sensors 206 which may include, for example, LiDAR data, RADAR data, camera image data, etc., perform navigation operations based on the sensor data, and control the speed and the steering of the vehicle to bring the vehicle to a destination. As shown in FIG. 2, AD navigation subsystem 220 can include a perception module 232, a localization module 234, and a planning module 236. Perception module 232 can analyze the sensor data from external sensors 206 to generate perception data about an environment the vehicle is operating in to determine a location of the vehicle. For example, perception module 232 can analyze the LiDAR and RADAR data to determine, for example, a distance between obstacles (e.g., landmarks, buildings, etc.) and the vehicle. Perception module 232 can also analyze the image data from the cameras to extract, for examples, images of landmarks, buildings, etc. Localization module 234 can obtain the perception data from perception module 232 and determine, for example, a direction of travel of the vehicle, a location of the vehicle, etc. For example, localization module 234 can store a set of locations of landmarks within a locale. Localization module 234 can determine a current position of the vehicle within the locale based on a landmark identified from the image data, as well as distance from the identified landmark based on the LiDAR and/or RADAR data. Planning module 236 can determine one or more control decisions of the vehicle (e.g., a direction of travel of the vehicle, a speed of the vehicle, etc.) based on the current position of the vehicle and a destination of the vehicle. Planning module 236 can transmit control signals via network 216 to electronic control units 210 to control the steer angle of the vehicle, the throttle of the engine of the vehicle (to control its speed), etc., based on the control decisions. Planning module 236 can also transmit the control decisions to infotainment system 204 for output. For example, infotainment system 204 may provide navigation output (e.g., audio and/or video feedback) to the passengers to let them know the location of the vehicle and which direction the vehicle is heading.

In addition, AD security subsystem 222 can provide security and protection to the vehicle by regulating access to various features and functions of the vehicle and by performing operations to minimize security and safety threats. As shown in FIG. 2, AD security subsystem 222 can include an access control module (ACM) 242, a monitor module 244, a threat mitigation module 246, and an over-the-air (OTA) update module 248. ACM 242 can control access to various software and hardware components of the vehicle. For example, ACM 242 can regulate access to the passenger cabin, the vehicle compartments, etc., to regulate physical access to the vehicle. ACM 242 can also regulate access to software features and functions provided by other electronic components of the vehicle including, for example, infotainment system 204. For example, infotainment system 204 may provide access to certain content (e.g., entertainment, news, navigation information, etc.), and the access to those content can be restricted to certain privileged users/passengers. The access restriction can be enforced by ACM 242. As to be described in more details below, ACM 242 can communicate with a requester of the access and/or with a remote trusted platform (e.g., a management server) to authenticate the requester and to determine the access right of the requester.

In addition, monitoring module 244 can monitor the operation condition of the vehicle based on, for example, obtaining sensor data from external sensors 206 (e.g., LiDAR, RADAR, camera, etc.), sensor data from internal sensors 208 (e.g., hood sensor, door sensor, speed sensor, light sensor, etc.), user inputs to electronic components of the vehicle (e.g., infotainment system 204, ACM 242), etc. Threat mitigation module 246 can detect security and/or safety risks from the operation condition, and perform one or more operations to mitigate the security and/or safety risks. For example, threat mitigation module 246 can determine, based on the speed sensor data and LiDAR data, that there is a high risk that the vehicle will collide with an obstacle in its current trajectory, and can control ECUs 210 to automatically apply the brakes on the vehicle. As another example, threat mitigation module 246 can determine that an attempt to open the cabin door is detected based on ACM 242 and the passenger cabin door sensor data, and that the person seeking to open the cabin door is not authorized to access the cabin. In such situations, threat mitigation module 246 can control actuators 212 to, for example, lock the cabin door. OTA update module 248 can receive update information from a remote server (e.g., a management service server) to update, for example, rules and patterns for security/safety threat detection.

In addition, vehicle electronic system 200 can include wireless interface 214 to perform long-range and short-range communication to support safety and/or security management operations. For example, wireless interface 214 may include long-range communication interface, such as a cellular modem, to transmit operation data (e.g., collected by monitoring module 244) to a remote management server, and to receive instructions from the remote management server to enable or disable accesses to various components of the vehicle. As another example, wireless interface 214 may include a short-range communication interface, such as Bluetooth, Near Field Communication (NFC), etc., to receive an access request from a mobile device for accessing the software and/or hardware components of the vehicle (e.g., vehicle compartment, infotainment system 204, etc.), and forward to access request as well as credential information to ACM 242.

Examples of a Vehicle Compartment Security System

Figure 3A:
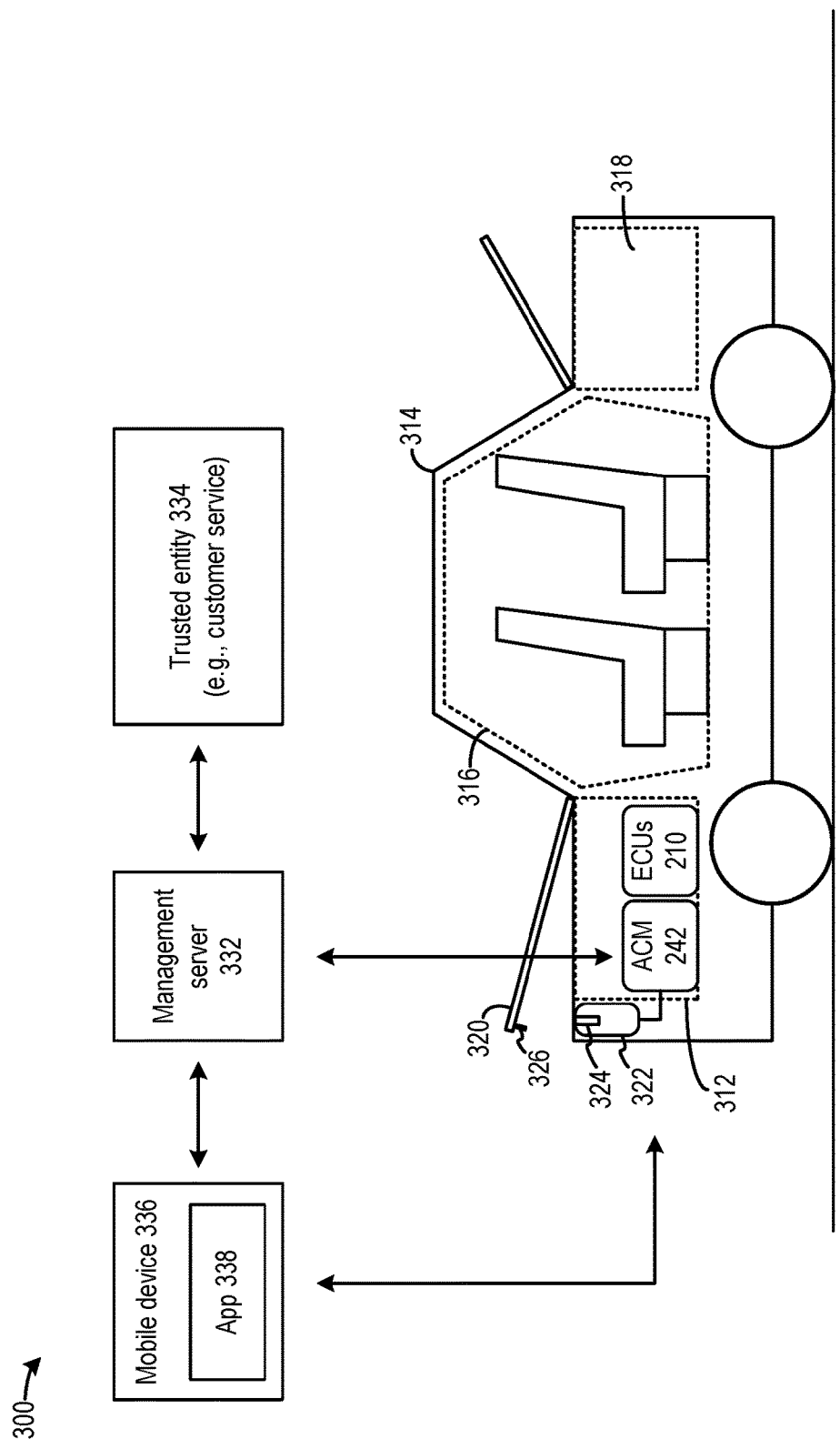
FIG. 3A-FIG. 3C illustrate examples of a vehicle compartment security system according to certain embodiments of the disclosed techniques.
Figure 3B:
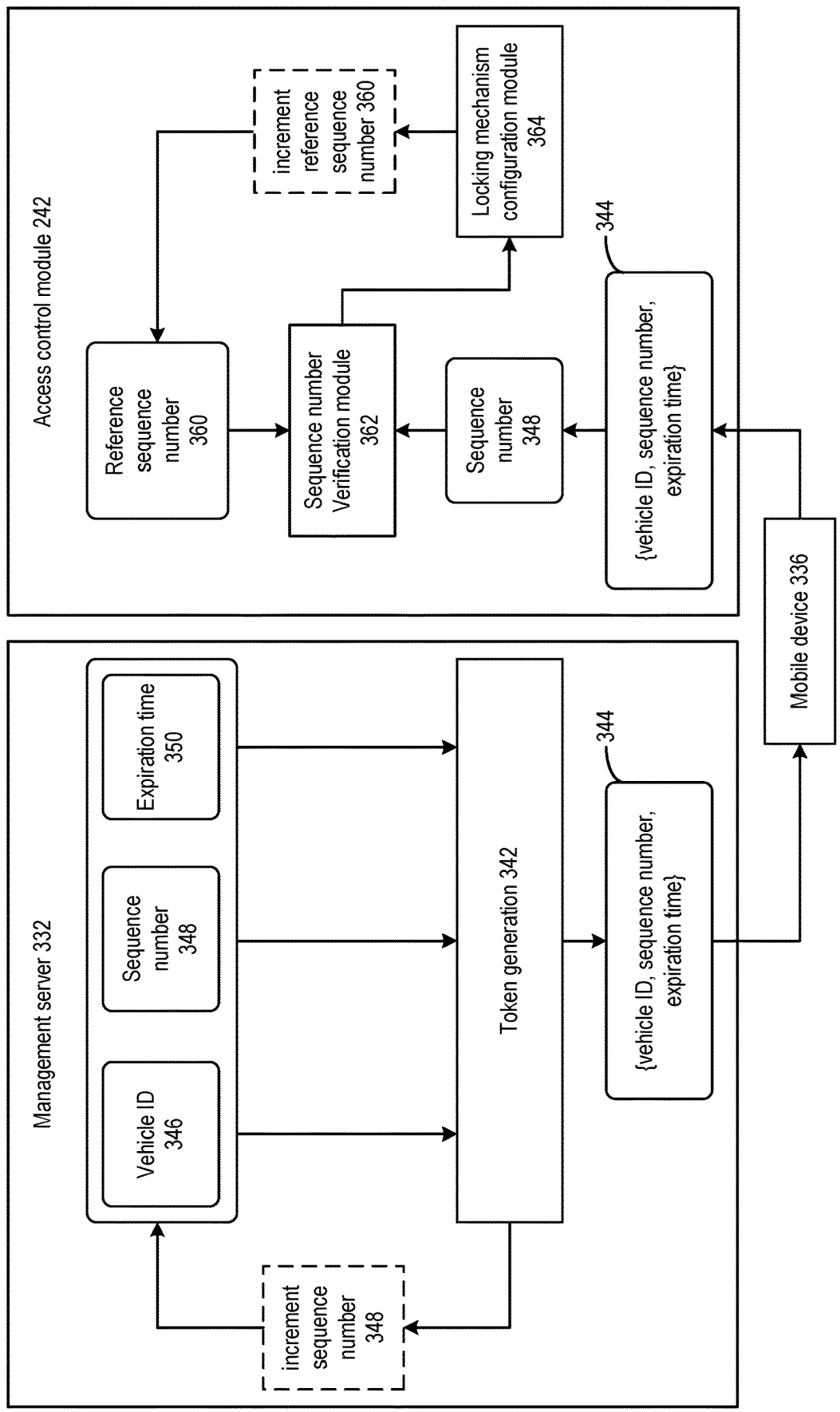
Figure 3C:
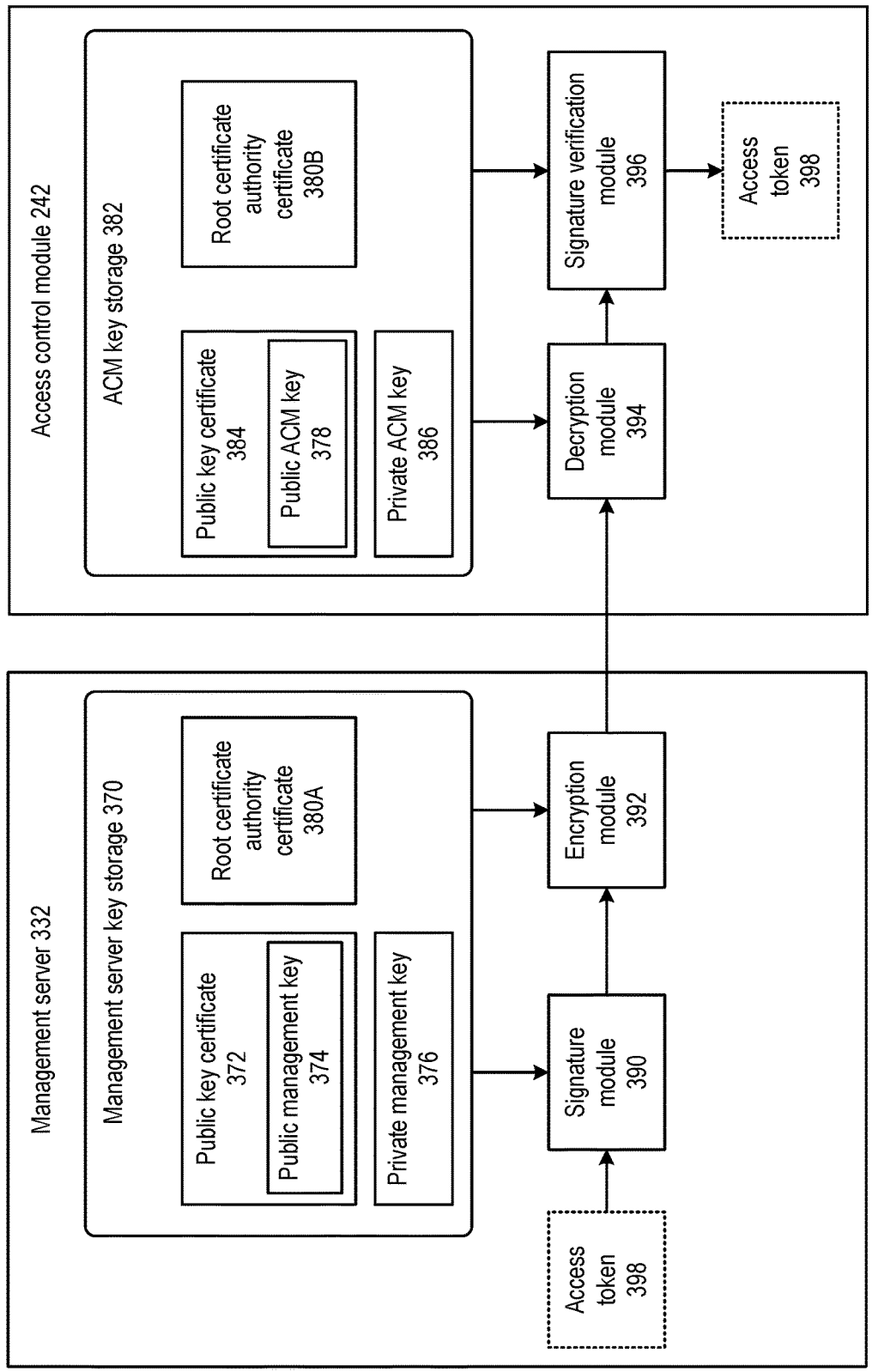

FIGS. 3A, 3B, and 3C illustrate an example of a vehicle compartment security system 300, according to certain embodiments. Vehicle compartment security system 300 can be part of security and safety platform 100 to control access to a vehicle compartment 312 of a vehicle 314, which can be an autonomous driving vehicle. Vehicle compartment 312 houses various mechanical and hardware components of vehicle 314 including, for example, ECU(s) 210, access control module (ACM) 242, engine (not shown in FIG. 3A), etc. Vehicle compartment 312 can be separated from passenger cabin 316 and trunk 318, and a passenger of vehicle 314 typically may not need to access vehicle compartment 312 to use vehicle 314 for transportation. Vehicle compartment 312 can be covered by a movable hood 320. During normal operation (e.g., when vehicle 314 is moving), movable hood 320 closes vehicle compartment 312 to protect the components housed within vehicle compartment 312 from external agents (e.g., water, dust, etc.). Movable hood 320 can be locked by a lock mechanism 322 during normal operation to prevent movable hood 320 from opening. Lock mechanism 322 can include various mechanical structures to perform a lock function. For example, as shown in FIG. 2, lock mechanism 322 may include a latch 324 to latch a hook 326 attached on hood 320, and the latch 324 can be locked at a fixed position during normal operation to prevent the opening of hood 320. Lock mechanism 322 can be disabled to unlock latch 324, and movable hood 320 can be moved by an actuator (e.g., a piston) to expose vehicle compartment 312. The actuator can be activated by a button (not shown in FIG. 3A), which can be a physical button within passenger cabin 316, a software button displayed by infotainment system 204, etc. As to be described in more detail below, the disabling of lock mechanism 322 can be regulated by vehicle compartment security system 300 to provide restricted access to vehicle compartment 312 for a limited group of people (e.g., privileged users such as the owner and/or the manager of vehicle 314) and/or under limited circumstances (e.g., when vehicle 314 requires repair service).

As shown in FIG. 3A, vehicle compartment security system 300 can include access control module (ACM) 242, a management server 332, and a trusted entity 334. ACM 242 can receive scope of access information from management server 332 for a requester (e.g., a passenger, an owner, a repair technician, etc.), and configure lock mechanism 322 based on the scope of access information. Management server 332 may store information indicating a current status of vehicle 314, the privilege states of users of vehicle 314, etc. The current status of vehicle 314 may indicate whether vehicle 314 has been activated in a check-in process. The privilege states may include credential information of a list of users of vehicle 314 (and other vehicles) designated as privileged users for vehicle 314, or for a group of vehicles including vehicle 314, based on predetermined privilege policies. On the other hand, a user who performs the check-in process as a renter of vehicle 314 or as a repair technician may not be privileged. Management server 332 can determine whether a requester is a privileged user based on the credential information provided by the requester and the credential information of the list of privileged users stored at management server 332. In another example, ACM (or other components of the vehicle) can store a list of privileged users and their credentials. A user can perform the check-in process at the vehicle and provide his/her credentials to allow the ACM to authenticate the user as a privilege user, and to provide the authenticated user with full and unlimited access of the vehicle compartment.

Management server 332 can determine the scope of access information based on the current status and privilege determination. For example, management server 332 can determine that no access shall be provided if vehicle 314 is not activated. Management server 332 can also determine full and unlimited access is to be provided if a requester for the access is a privileged user, and if vehicle 314 is activated. Management server 332 can transmit a full-access token to ACM 242 which can disable lock mechanism 322 based on receipt of the full-access token. In such a case, a requester can access vehicle compartment 312 by activating a button (e.g., within passenger cabin 316) without making a request to disable lock mechanism 322.

In some cases, management server 332 may also receive the scope of access information from trusted entity 334. Trusted entity 334 may include, for example, customer service, an administrator (and/or manager) of management server 332, etc., which can store operation information to verify whether a request to access vehicle compartment 312 is legitimate and should be granted for a requester who is not a privileged user. The operation information may include, for example, an event log of vehicle 314 (e.g., whether the vehicle has been towed to a repair shop), a current status of vehicle (e.g., whether the vehicle is in a disabled state), access policies, etc. In some cases, trusted entity 334 can determine scope of access for the requester based on the operation information, and transmit the scope of access information to management server 332, which may then forward the scope of access information to ACM 242.

For example, a repair technician may seek to gain access to vehicle compartment 312 to perform repair work. The repair technician may transmit a request including a vehicle identifier of vehicle 314 to trusted entity 304 to access the compartment. Trusted entity 304 may search the event log based on the vehicle identifier and determine that vehicle 314 is at a repair shop based on the event log and that the request is received from the repair shop. Trusted entity 304 may then determine that the request is legitimate, and can grant full and unlimited access to vehicle compartment 312. Trusted entity 304 can instruct management server 332 to generate data indicating full and unlimited access to vehicle compartment 312 (e.g., in the form of a full-access token) of vehicle 314. The data may also include the vehicle identifier of vehicle 314. Management server 332 can generate the unlimited access token and transmit the full-access token including the vehicle identifier of vehicle 314 to ACM 242, which can disable lock mechanism 322 based on receipt of the full-access token, and based on verifying that the full-access token is targeted at vehicle 314 (e.g., based on the vehicle identifier included with the token). ACM 242 can maintain lock mechanism 322 in a disabled state until, for example, receiving a second instruction from management server 332 to revoke the full and unlimited access granted to the requester (e.g., when the repair work completes).

In addition, mobile device 336 can be operated by the requester (e.g., an owner and/or a manager of vehicle 312, a passenger of the vehicle, a repair technician, etc.) and can store credential information of the requester including, for example, an identifier of the requester, password, etc. Mobile device 336 can provide the credential information to management server 332, which can determine the scope of access information based on the credential information for ACM 242. Moreover, mobile device 336 can also provide credential information of the requester to ACM 242, which can also determine the scope of access of the requester based on the locally-stored credential information and list of privileged users. In both cases, ACM 242 can configure lock mechanism 322 to provide the scope of access of vehicle compartment 312 to the requester without communicating with management server 332.

As an illustrative example, ACM 242 may lose long-range communication with management server 332 (e.g., due to the malfunction of the cellular modem of the vehicle), but ACM 242 can communicate with mobile device 336 (and App 338) using short-range communication protocols such as Bluetooth and NFC. Prior to communicating with ACM 242, App 338 can transmit a request to access vehicle compartment 312 of vehicle 314 to management server 332. The request may include credential information of the requester (e.g., a user name associated with a passenger requester, an indication that the requester is a repair technician, etc.), as well as a vehicle identifier of vehicle 314. Management server 332 can determine the scope of access based on the credential information, as well as a current status of the vehicle. For example, if the credential information indicates that the requester is a privileged user (e.g., an owner and/or a manager of vehicle 314, etc.), and the vehicle is activated by the check-in process, management server 332 can determine that the requester is to have full and unlimited access to vehicle compartment 312. Further, in a case where the credential information indicate that the requester is not a privileged user (e.g., a passenger, a repair technician, etc.), management server 332 can communicate with trusted entity 334 to determine the scope of access. For example, in a case where the requester is a repair technician, and upon determining that the request is legitimate based on the event log, trusted entity 334 may determine to grant a full and unlimited access to vehicle compartment 312 to the requester. In both cases, management server 332 can transmit the full-access token including the vehicle identifier to App 338, which can transmit the full-access token to ACM 242 via short-range communication. ACM 242 can disable lock mechanism 322 based on receipt of the full-access token and based on verifying that the full-access token is targeted at vehicle 314 (e.g., based on the vehicle identifier).

Moreover, in a case where the requester is a repair person (or other non-privileged users), trusted entity 334 may determine that the request poses little safety and/or security risk, and may grant a one-time and time-limited access to vehicle compartment 312 to the requester. In such a case, management server 332 can generate a temporary access token which include access scope information. The access information may indicate, for example, the access is one-time only, as well as an expiration time of the access. Management server 332 can transmit the temporary access token including the vehicle identifier to App 338, which can transmit the temporary access token to ACM 242 (e.g., via short-range communication). ACM 242 can disable lock mechanism 322 based on receipt of the temporary access token until the expiration time arrives. On the other hand, if trusted entity 334 receives information from, for example, threat intelligence source 120 of FIG. 1, which indicates that vehicle 314 is under threat, trusted entity 334 may also deny the non-privileged user access to vehicle compartment 312.

In a case where ACM 242 enables lock mechanism 322 to deny the requester access to vehicle compartment 312, ACM 242 may perform additional actions to secure vehicle compartment 312. For example, ACM 242 may detect unauthorized physical access to the interior of vehicle compartment 312. ACM 242 may also detect unauthorized physical access to the components housed within vehicle compartment 312. ACM 242 can then perform one or more operations to deter the unauthorized access, or at least to mitigate the loss caused by the unauthorized access. In some examples, the operations can be defined based on policies included in risk management policy storage 126, transportation asset management policy 132, security operation storage module 136, etc., of security and safety platform 100 of FIG. 1. In some examples, the policies, as well as the definitions of the operations, can also be locally stored in ACM 242, which can then determine the operations even if the communication with security and safety platform 100 is lost.

There are various ways by which ACM 242 may detect unauthorized physical access to vehicle compartment 312. For example, movable hood 320 may include a motion sensor. Vehicle compartment 312 may also include a light sensor. As movable hood 320 moves to expose vehicle compartment 312. The movement of movable hood 320 can be detected by the motion sensor, whereas the exposure of vehicle compartment 312 can be detected by the light sensor. If ACM 242 enables lock mechanism 322 but detects that vehicle compartment 312 is exposed based on the motion sensor and/or light sensor output, ACM 242 may determine that unauthorized physical access to vehicle compartment 312 is underway. Further, some or all of the components installed within vehicle compartment 312 (e.g., ECUs 210) can include a motion sensor. ACM 242 may detect movement of the components based on the motion sensor data and determine that unauthorized physical access to vehicle compartment 312 is underway.

ACM 242 may perform one or more operations based on detection of the unauthorized physical access. For example, ACM 242 may control a camera installed in the vehicle and facing vehicle compartment 312 to capture a picture of the intruder who accesses the vehicle compartment. As another example, ACM 242 may also notify other entities (e.g., the management, the local law enforcement, etc.) about the unauthorized access. Further, ACM 242 may also control an alarm of the vehicle to output loud alarm sound to deter the intruder.

FIG. 3B illustrates an example of generation and processing of temporary access tokens between management server 332 and access control module (ACM) 242. Management server 332 may include a token generation module 342, which can generate a temporary access token 344. Management server 332 can transmit temporary access token 344 to mobile device 336 in response to receiving a compartment access request from mobile device 336, which can then transmit temporary access token 344 to ACM 242 to access vehicle compartment 312 in a case when, for example, ACM 242 loses communication with management server 332, as described above.

As shown in FIG. 3B, temporary access token 344 may include a vehicle identifier 346 (vehicle ID) and an optional sequence number 348 to enforce one-time temporary access. Temporary access token 344 may also include other information including, for example, a set of compartment identifiers and their associated scopes of access (e.g., full access, limited access, one-time or limited-times access, etc.), which may include expiration time information 350. The vehicle identifier allows ACM 242 to verify that the it is the intended recipient of the temporary access token, for example, by comparing vehicle identifier 346 against a reference vehicle identifier of the vehicle that includes ACM 242. In addition, expiration time information 350 indicates when temporary access token 344 expires. Expiration time information 350 can be in various formats. For example, expiration time information 350 can include a date and a time of expiration. ACM 242 can maintain a clock that tracks a current date and a current time at vehicle 314. ACM 242 can disable lock mechanism 322 until the current date and time, indicated by the clock, match the date and time of expiration. As another example, expiration time information 350 may also include an expiration count value. ACM 242 can start a first counter when the disabling of lock mechanism 322 starts. The disabling of lock mechanism 322 can stop when the counter value reaches the expiration count value. In some examples, ACM 242 can maintain a second counter that counts a number of times the expiration count value has been reached, which indicates a number of times access has been granted to a particular vehicle compartment. The second counter can be used to enforce a limited-times access where the user is allowed to access the vehicle compartment for a limited number of times, with the duration of each access being governed by expiration time information 350 and monitored by the first counter.

In addition, as described above, temporary access token 344 may be used for a one-time access. After the current temporary access token expires or used, the requester must present a new temporary access token to access vehicle compartment 312 again. There are various ways by which ACM 242 can enforce an one-time access policy. For example, ACM 242 can maintain a secure clock which not only tracks the current date and time but is also secure against tampering. ACM 242 can accept a temporary access token and disable lock mechanism 322 only if the current date and time precede the expiration time and date of the temporary access token. ACM 242 can also delete the temporary access token when the token expires. With such an arrangement, the risk of ACM 242 providing access vehicle compartment 312 based on accepting an expired token can be mitigated.

In some examples, ACM 242 can also enforce the one-time access policy by tracking a state of temporary provision of compartment access. The state can be tracked based on sequence number 348 included in temporary access token 344. More specifically, management server 332 can store sequence number 348 included in the most recent temporary access token (e.g., temporary access token 344), and can increment sequence number 348 for the next temporary access token. Moreover, ACM 242 can store a reference sequence number 360 extracted from the last temporary access token received by ACM 242. ACM 242 further includes sequence number verification module 362 to verify that a new temporary access token has been received. For example, sequence number verification module 362 can compare reference sequence number 360 against sequence number 348 extracted from temporary access token 344. If reference sequence number 360 is below sequence number 348, ACM 242 can determine that temporary access token 344 is a new access token, rather than an expired access token, and can control locking mechanism configuration module 364 to disable lock mechanism 322. After temporary access token 344 expires, ACM 242 can remove temporary access token 344 and increment reference sequence number 360 to match sequence number 348, such that reference sequence number 360 reflects the sequence number extracted from the last temporary access token received by ACM 242, in this case temporary access token 344.

In some embodiments, to further improve security, a secure communication channel can be established between different components of vehicle compartment security system 300 for secure transmission of access tokens. For example, a secure communication channel, such as a Transport Layer Security (TLS) session, can be established between ACM 242 and management server 332, and between mobile device 336 and ACM 242. Mutual authentication can take place between ACM 242 and management server 332, and between mobile device 336 and ACM 242, before the respective secure communication channel is established. The mutual authentication enables mobile device 336 and ACM 242 to verify that they are receiving an access token from a trusted issuer of the access token. Moreover, management server 332 can also verify that mobile device 336 and ACM 242 are trusted devices and are allowed to receive the access token from management server 332. In addition, management server 332 can sign the access token using a management key owned by management server 332 and, optionally, encrypt the access token with the signature. The optional encryption can be performed using, for example, a public key of ACM 242, a shared symmetric key, etc. The access token can be sent to ACM 242, which can include the corresponding private key or shared symmetric key to perform the decryption of the access token. All these can mitigate the risks of, for example, a malicious user using a fake access token not procured from management server 332, or an access token intercepted from management server 332, to obtain unauthorized access to vehicle compartment 312.

FIG. 3C illustrates an example of a secure transmission of an access token from management server 332 to access control module (ACM) 242, according to certain embodiments. As shown in FIG. 3C, management server 332 includes a management server key storage 370 that stores a public key certificate 372 which includes a public management key 374, and a private management key 376, all of which are associated with management server 332. Management server key storage 370 further stores a root certificate authority certificate 380A which can be used to verify ACM 242's certificate. In some examples, management server 332 can receive the keys in a provisioning process before vehicle 312 is made available for transportation operations.

In addition, ACM 242 includes ACM key storage 382 that stores a public key certificate 384 of ACM 242. Public key certificate 384 further includes public ACM key 378. Further, ACM key storage 382 also stores a private ACM key 386, and a root certificate authority certificate 380B which can be used to verify management server 332's certificate. Management server 332 further includes a signature module 390 and an encryption module 392, whereas ACM 242 includes a decryption module 394 and a signature verification module 396.

As part of a mutual authentication process to establish a secure communication channel (e.g., a TLS session), management server 332 can transmit its public key certificate 372 to ACM 242, whereas ACM 242 can transmit its public key certificate 384 to management server 332. Public key certificate 372 of management server 332 can be verified by a public key included in root certificate authority certificate 380B of ACM 242, whereas public key certificate 384 of ACM 242 can be verified by a public key included in root certificate authority certificate 380A of management server 332. For example, management server 332 can authenticate ACM 242 based on verifying that public key certificate 384 is signed with a key from an ACM root certificate authority define in root certificate authority certificate 380A, and based on the content of public key certificate 384 (e.g., public key certificate 384 including an identifier of a trusted ACM). Further, ACM 242 can authenticate management server 332 based on verifying that public key certificate 372 is signed with a key from a Management Server root certificate authority defined in root certificate authority certificate 380B, and based on the content of public key certificate 372 (e.g., public key certificate 372 including an identifier of a trusted management server). Upon successful authentication, management server 332 can extract public ACM key 378 from public key certificate 384. Further, ACM 242 can extract public management key 374 from public key certificate 372.

To perform secure transmission of an access token 398 (which may include, for example, a vehicle identifier, and in some cases, access scope information including a sequence number, expiration time information, etc.), management server 332 can control signature module 390 to sign access token 398 using private management key 376. Management server 332 can also control encryption module 392 to encrypt the signed access token using public ACM key 378 (extracted from public key certificate 384), or a symmetric key. Management server 332 can then transmit the signed and encrypted access token 398 to ACM 242. ACM 242 can control decryption module 394 to decrypt the received access token using private ACM key 386. ACM 242 can also control signature verification module 396 to verify the signature of the decrypted access token 398 using public management key 374 (extracted from public key certificate 372), or using a symmetric key, to ensure that access token 398 is received from the authenticated management server 332. ACM 242 also verifies that the access token is intended to ACM 242 based on the vehicle identifier included in the access token. Upon verifying the signature, the vehicle identifier, and other information (e.g., vehicle compartment identifier), ACM 242 can control locking mechanism configuration module 364 (not shown in FIG. 3C) to provide access to vehicle compartment 312 based on the access scope information included in access token 398.

Although FIG. 3C illustrates an example of secure transmission of access token from management server 332 to ACM 242, it is understood that the example of secure transmission can also be performed between management server 332 and mobile device 336. For example, mobile device 336 can also store a public key certificate including a public key of mobile device 336, and Management Server root certificate authority certificate 380A. Management server 332 and mobile device 336 can perform mutual authentication based on the techniques described above, and mobile device 336 can receive the encrypted and signed access token 398 from management server 332. Mobile device 336 can decrypt the access token, then transmit the decrypted (but signed) access token 398 to ACM 242, which can verify the signature of access token 398 using management server 332's certificate and provide access to vehicle compartment 312. In some examples, mobile device 336 may receive or generate the management key and perform mutual authentication with ACM 242 using the management key. Mobile device 336 can also sign the access token using the management key and transmit the signed access token to ACM 242 to gain access to vehicle compartment 312.

Method

Figure 4A:
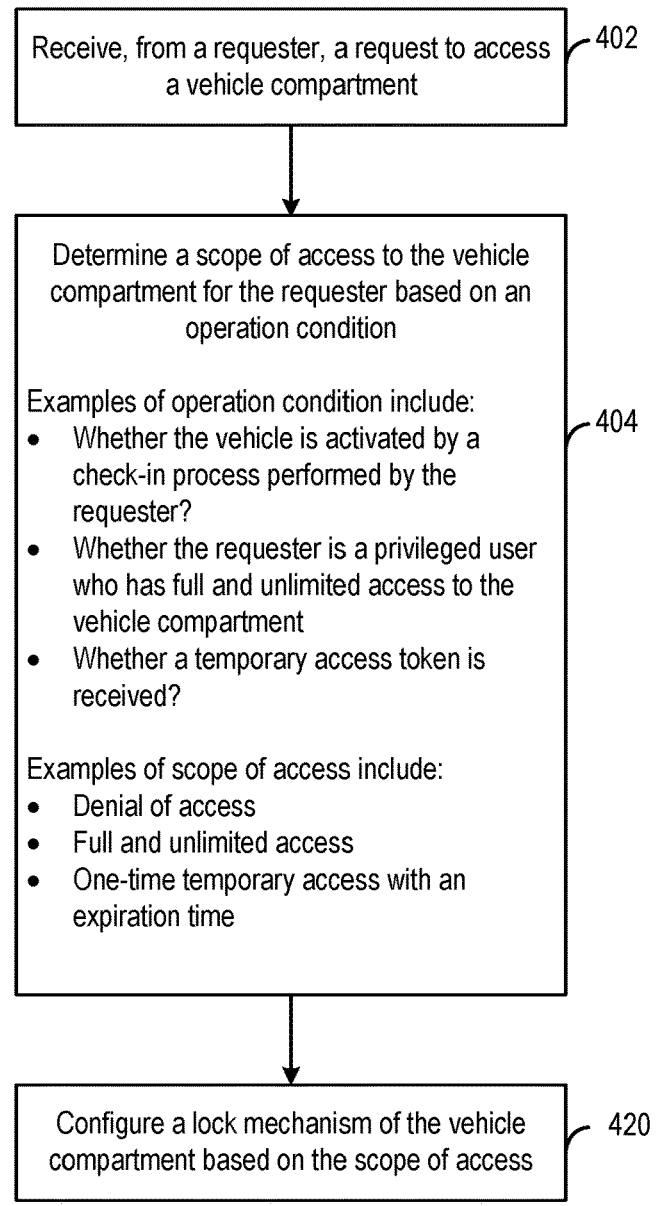
FIG. 4A-FIG. 7 illustrate flow charts of example methods for controlling the access to a vehicle compartment, according to certain embodiments.
Figure 4B:
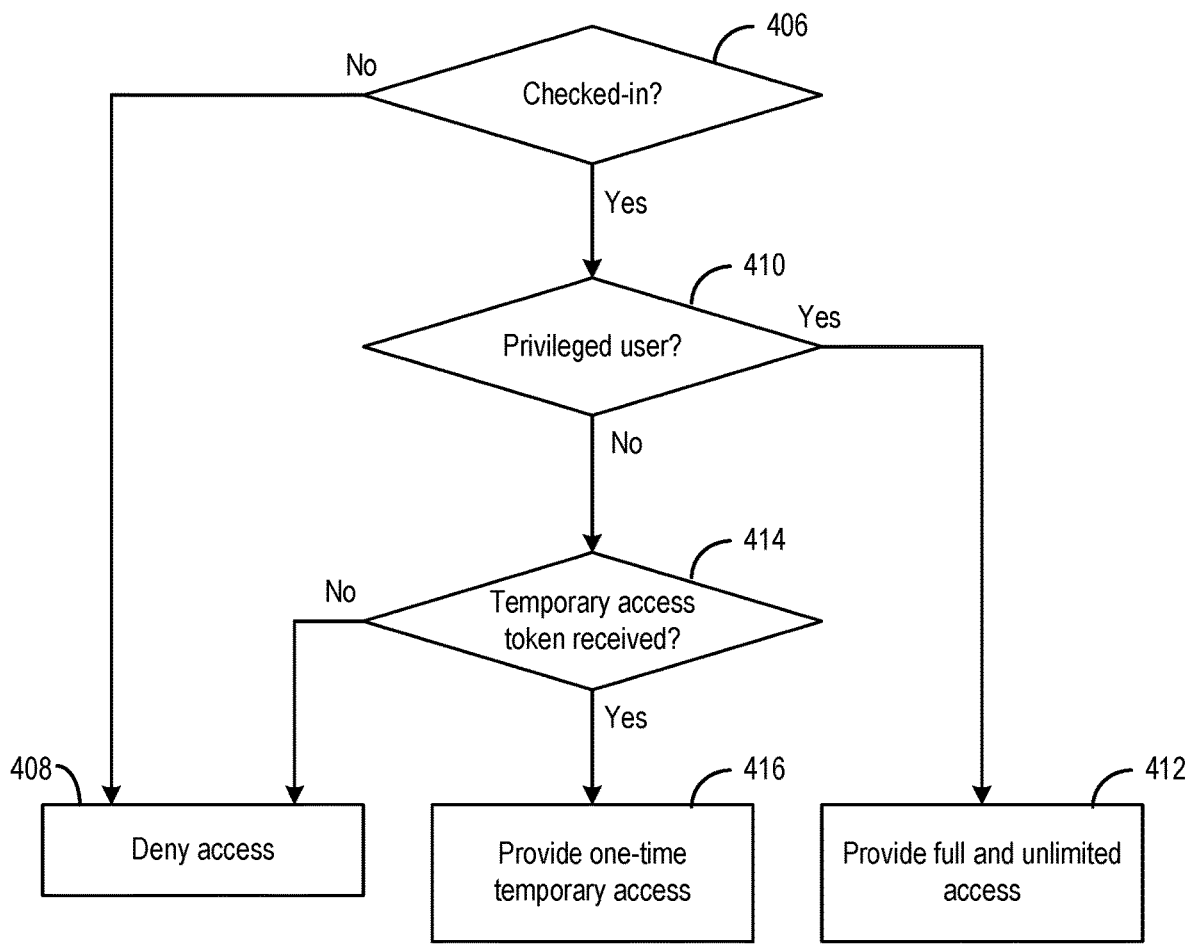

FIG. 4A and FIG. 4B show a simplified flow diagram of method 400 for controlling the access to a vehicle compartment (e.g., vehicle compartment 312), according to certain embodiments. Method 400 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 400 can be performed by vehicle compartment security system 300 of FIG. 3A-FIG. 3C.

Referring to FIG. 4A, at operation 402, the system may receive, from a requester, a request to access a vehicle compartment. There are various ways by which the system can receive the request. For example, an access control module (e.g., ACM 242) at the vehicle can receive the request based on detecting the activation of an actuator (e.g., a physical button, a software button, etc.) to open the hood that covers the vehicle compartment. As another example, a management server of the system (e.g., management server 332) can also receive the request from a mobile device, from a customer service server operated by a trusted entity, etc. The requester may include, for example, an owner/manager of the vehicle, a passenger of the vehicle, a repair technician, or any person.

At operation 404, the system may determine a scope of access to the vehicle compartment for the requester based on an operation condition. Examples of the operation condition may include, for example, whether the vehicle is activated by a check-in process performed by the requester, whether the requester is a privileged user who has full and unlimited access to the vehicle compartment, whether a temporary unlock instruction is received, etc. Examples of scope of access may include, for example, denial of access, full and unlimited access, one-time temporary access with an expiration time, etc.

FIG. 4B illustrate an example of operations included in operation 404 to determine a scope of access to the vehicle compartment for the requester based on an operation condition, according to certain embodiments. As shown in FIG. 4B, at operation 406, the system may determine whether the requester has activated the vehicle via a check-in process at the management server. If no check-in process has been performed, the system may deny the requester access to vehicle compartment 312, at operation 408.

On the other hand, if a check-in process has been performed, the system may determine whether the requester is a privileged user, at operation 410. The determination can be based on comparing the credential information provided by the requester against a list of users designated as privileged users including, for example, the owner and/or the manager of the vehicle. If the requester is a privileged user, the system may provide full and unlimited access to vehicle compartment 312, at operation 412.

Moreover, if the requester is not a privileged user, the system (e.g., the ACM) may determine whether a temporary access token has been received (e.g., from management server), at operation 414. As described above, a management server may issue a temporary access token to a requester based on an instruction from a trusted entity, and the temporary access token may enable a one-time temporary access with an expiration time. If the ACM receives the temporary access token, the system may provide the one-time temporary access to vehicle compartment 312, at operation 416. If the ACM does not receive the temporary access token, the system may deny the requester access to vehicle compartment 312, at operation 408.

Referring back to FIG. 4A, at operation 420 the system may configure a lock mechanism of the vehicle compartment based on the scope of access determined at operation 404. The configuration may include, for example, enabling the lock mechanism to deny the requester access, disabling the lock mechanism to provide the requester full and unlimited access, or disabling the lock mechanism until the expiration time arrives to provide the requester temporary access. The system may perform additional operations to enforce one-time temporary access and/or to detect unauthorized access to the vehicle compartment, as described above with respect to FIG. 3A and FIG. 3B.

Figure 5:
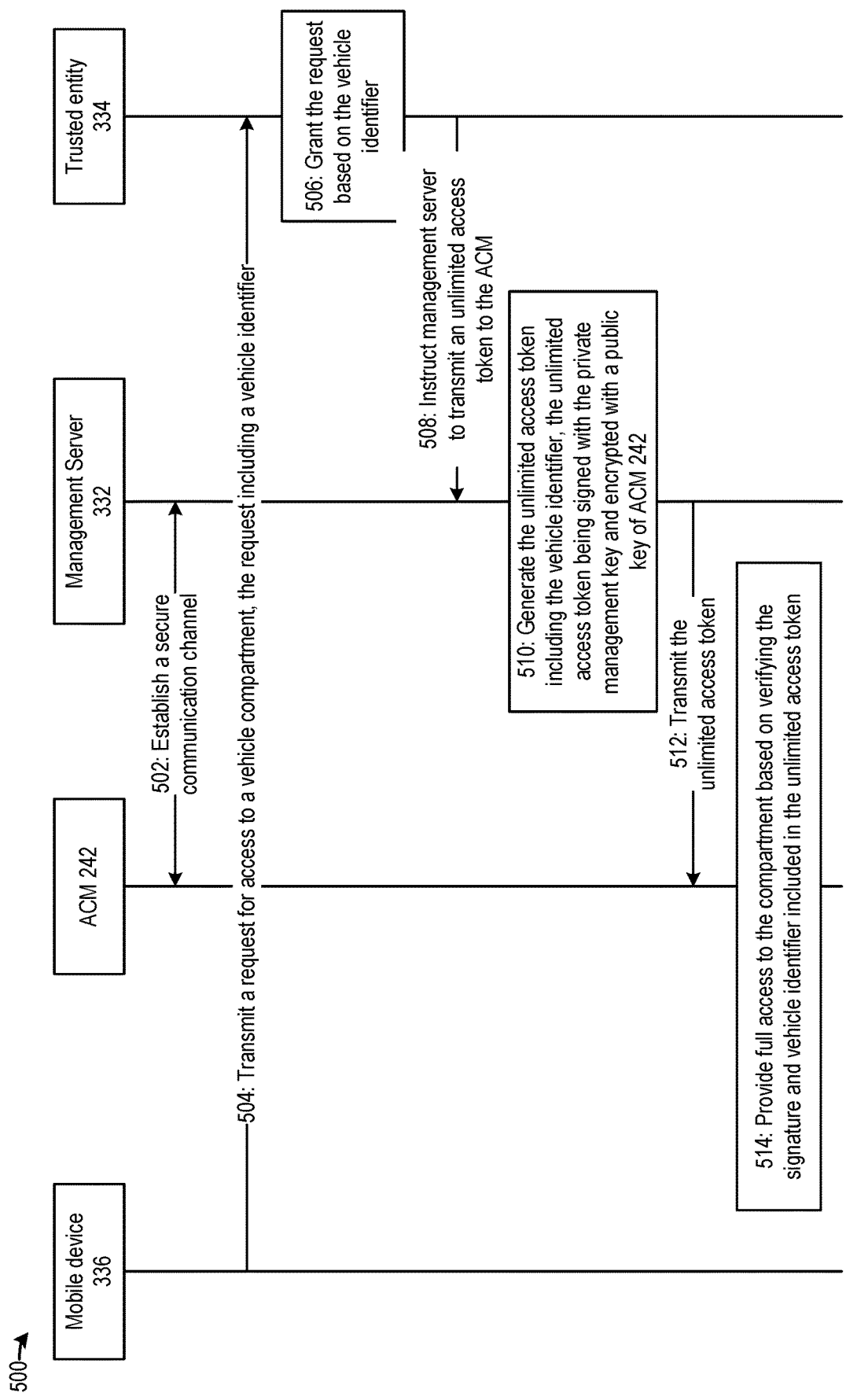

FIG. 5 shows a simplified flow diagram of method 500 for controlling the access to a vehicle compartment (e.g., vehicle compartment 312), according to certain embodiments. Method 500 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 500 can be performed by vehicle compartment security system 300 of FIG. 3A-FIG. 3C including mobile device 336, ACM 242, management server 332, and trusted entity 334. In this example, mobile device 336 may be operated by a repair technician, whereas trusted entity 334 can be operated by customer service.

At operation 502, ACM 242 and management server 332 may establish a secure communication channel based on, for example, exchanging public key certificates, as described in FIG. 3C. As part of the exchanging of public key certificates, management server 332 can also transmit its public management key (e.g., public management key 374 of FIG. 3C) to ACM 242. Management server 332 also receives public key of ACM 242. The secure communication channel may include, for example, a TLS session. Mutual authentication between ACM 242 and management server 332 also takes place at operation 502.

At operation 504, mobile device 336, operated by the repair technician, may transmit a request for access to a vehicle compartment to trusted entity 334. The request may include a vehicle identifier of the vehicle having the vehicle compartment.

At operation 506, trusted entity 334 may grant the request based on the vehicle identifier included in the request. For example, as described above, trusted entity 334 may refer to an event log and determine that a vehicle having the vehicle identifier is towed to a repair shop, and determine that the request to access the vehicle compartment is legitimate.

At operation 508, trusted entity 334 may transmit an instruction to management server 332 to transmit an unlimited access token to ACM 242, based on determining that the access request is legitimate at operation 506.

At operation 510, management server 332 may generate the unlimited access token including the vehicle identifier. Management server 332 may also sign the unlimited access token using its private management key and encrypt the signed access token with a public key of ACM 242, as described with respect to FIG. 3C.

At operation 512, management server 332 may transmit the encrypted and signed access token to ACM 242 via the secure communication channel established in operation 502.

At operation 514, ACM 242 may decrypt the token and verify the signature and the vehicle identifier and other information (e.g., expiration or sequence number) included in the unlimited access token and, based on the verification, provide the requester with full and unlimited access to the vehicle compartment.

Figure 6:
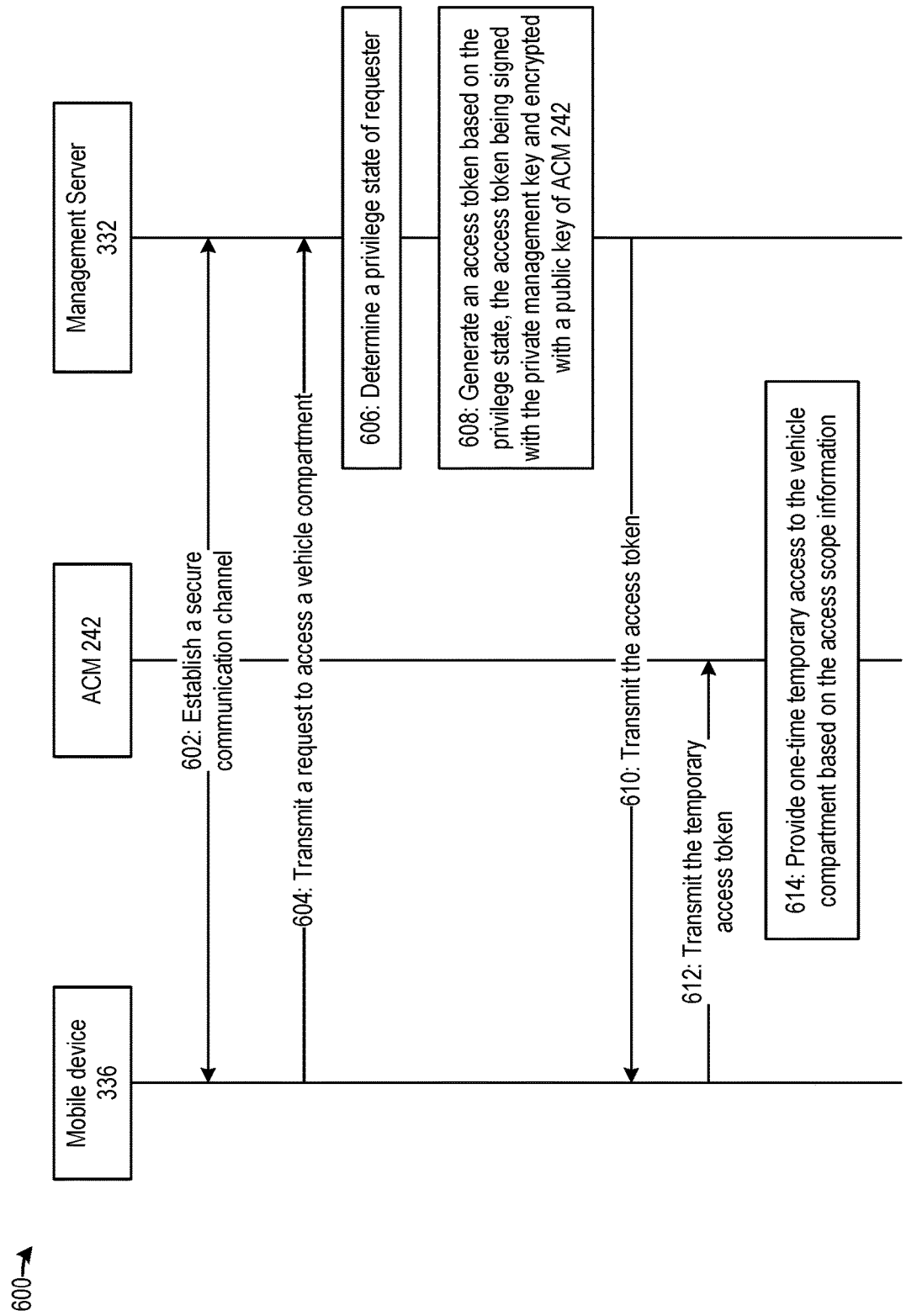

FIG. 6 shows a simplified flow diagram of method 600 for controlling the access to a vehicle compartment (e.g., vehicle compartment 312), according to certain embodiments. Method 600 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by certain components of vehicle compartment security system 300 of FIG. 3A-FIG. 3C including mobile device 336, ACM 242, management server 332, and trusted entity 334. In this example, ACM 242 may be unable to communicate with management server 332 temporarily (e.g., no cellular access), but can communicate with mobile device 336 using a short-range communication protocol including, for example, Bluetooth, NFC, Wi-Fi, ZigBee, unlicensed LTE, Infra-red communication, Quick Response (QR) code scan, image scan, etc.

At operation 602, ACM 242 and mobile device 336 may establish a secure communication channel based on, for example, exchanging public key certificates, as described in FIG. 3C. The secure communication channel may include, for example, a TLS session. Mutual authentication between ACM 242 and mobile device 336 also takes place at operation 602.

At operation 604, mobile device 336, operated by a requester (e.g., an owner, a passenger, etc.) may transmit a request for access to a vehicle compartment to management server 332. The request may include a vehicle identifier of the vehicle having the vehicle compartment as well as credential information of the requester.

At operation 606, management server 332 may determine a privilege state of the requester. The determination can be based on, for example, comparing the credential information in the request against the credential information of a list of privileged users.

At operation 608, management server 332 may generate an access token based on the privilege state. If the requester is a privileged user, management server 332 may generate an unlimited access token. If the requester is not a privileged user, management server 332 may communicate with trusted entity 334 (not shown in FIG. 6) to determine an access scope for the requester. Based on the input from trusted entity 334, management server 332 may generate a temporary access token including access scope information. The access scope information may include, for example, a sequence number to ensure one-time access, and expiration time information, as described in FIG. 3B. The access token is signed with the private management key of management server 332 and encrypted with a public key of ACM 242. Management server 332 may obtained the public key of ACM 242 via a prior communication session with ACM 242.

At operation 610, management server 332 may transmit the encrypted and signed access token to mobile device 336, which can store the access token. In some examples, management sever may transmit the encrypted access token to mobile device 336, which can sign the access token with a private management key.

At operation 612, mobile device 336 may transmit a request to access vehicle compartment 312, with the request including the access token obtained from management server 332.

At operation 614, ACM 242 may verify the signature and the vehicle identifier included in the unlimited access token and, if the signature is verified, provide the requester with access to the vehicle compartment according to the access scope information. For example, if an unlimited access token is received, ACM 242 may provide full and unlimited access. If a temporary access token is received, ACM 242 may provide one-time temporary access.

Figure 7:
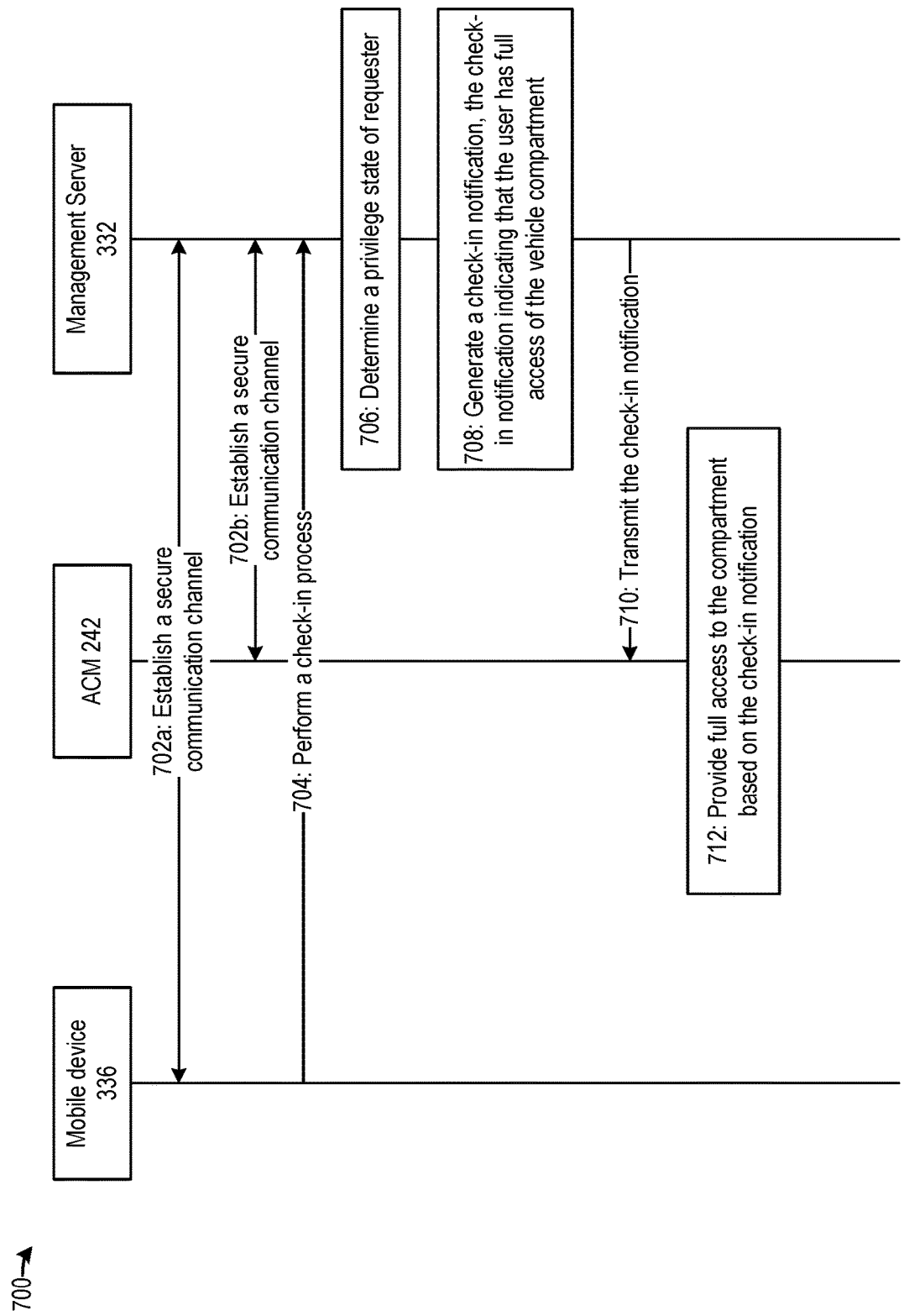

FIG. 7 shows a simplified flow diagram of method 700 for controlling the access to a vehicle compartment (e.g., vehicle compartment 312), according to certain embodiments. Method 600 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by certain components of vehicle compartment security system 300 of FIG. 3A-FIG. 3C including mobile device 336, ACM 242, and management server 332. In this example, a user can use their mobile device perform a check-in process with management server 332 to activate a vehicle.

At operation 702a, ACM 242 and mobile device 336 may establish a secure communication channel based on, for example, exchanging public key certificates, as described in FIG. 3C. Moreover, at operation 702b, ACM 242 and management server 332 may also establish a secure communication channel based on, for example, exchanging public key certificates, as described in FIG. 3C. Each secure communication channel may include, for example, a TLS session.

At operation 704, mobile device 336, operated by a user (e.g., an owner, a passenger, etc.) may transmit a request to perform a check-in operation to activate a vehicle. The request may include credential information of the user.

At operation 706, management server 332 may determine a privilege state of the user. The determination can be based on, for example, comparing the credential information in the user against the credential information of a list of privileged users.

At operation 708, management server 332 may generate a check-in notification based on completion of the check-in process. The check-in notification may include an indication that the user is a privileged user and has full and unlimited access to vehicle compartment 312.

At operation 710, management server 332 may transmit the check-in notification to ACM 224, which can store the check-in notification.

At operation 712, management server 332 may provide full access to the compartment based on the check-in notification indicating that the user is a privileged user and has full and unlimited access to vehicle compartment 312.

Computer System

Figure 8:
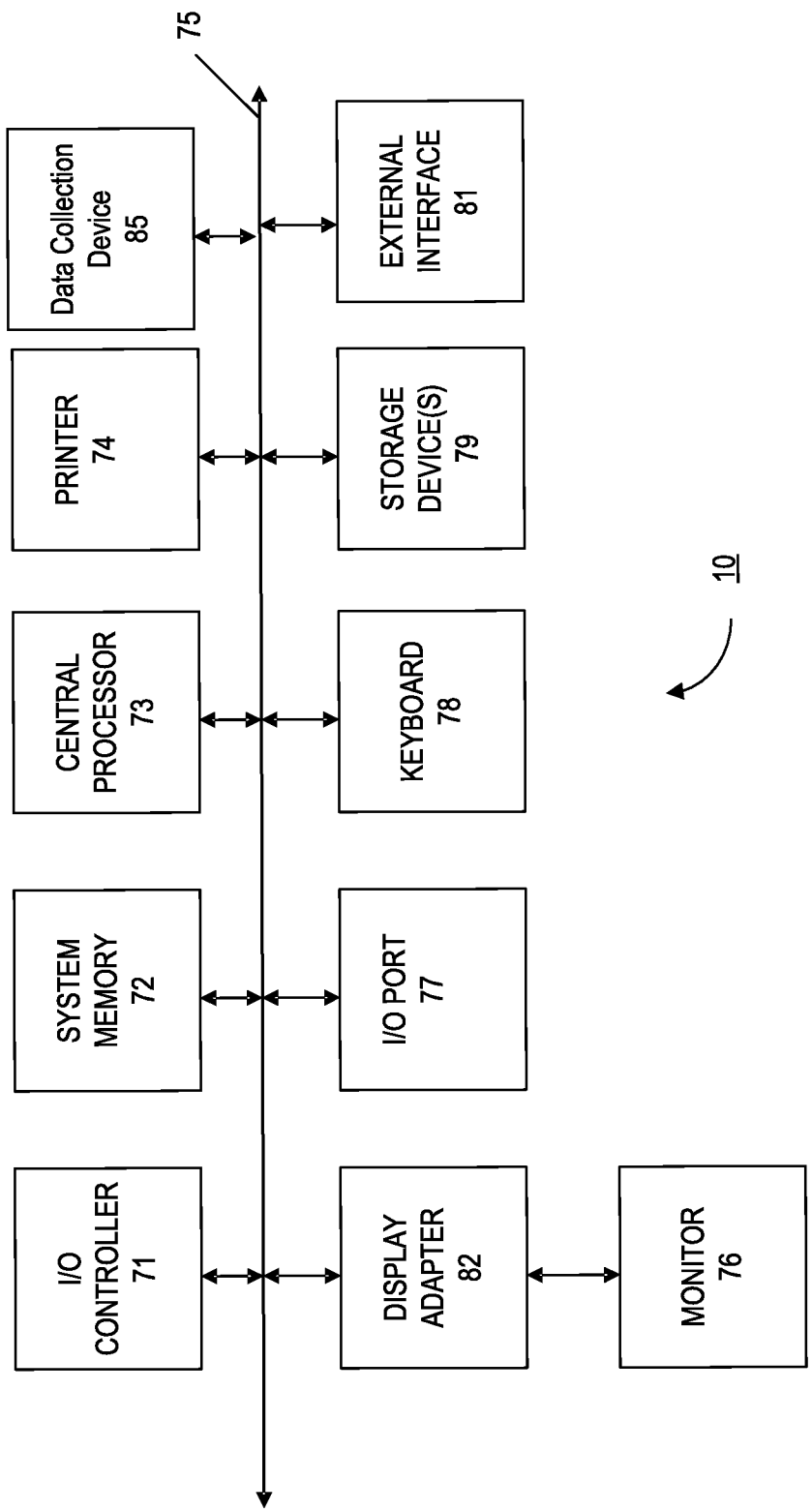
FIG. 8 illustrates an example computer system that may be utilized to implement techniques disclosed herein.

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices. In some embodiments, a cloud infrastructure (e.g., Amazon Web Services), a graphical processing unit (GPU), etc., can be used to implement the disclosed techniques, including the techniques described from FIG. 1-FIG. 7.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising:
    a memory that stores a set of instructions; and
    a hardware processor configured to execute the set of instructions to:
        receive, from a requester, a request to access a vehicle compartment of a vehicle;
        determine a scope of access of the vehicle compartment for the requester based on an operation of the vehicle; and
        configure a lock mechanism of the vehicle compartment based on the scope of access.

2. The apparatus of claim 1, wherein the hardware processor is configured to execute the set of instructions to:
    determine the scope of access based on whether the requester has performed a check-in process at a management server, the check-in process comprising the requester providing credential information to authenticate that the requester is a privileged user.

3. The apparatus of claim 1, wherein the hardware processor is configured to execute the set of instructions to:
    receive an access token from a management server, the access token including an indication of the scope of access of the vehicle compartment and is transmitted by the management server based on a command from a trusted entity; and
    responsive to receiving the access token, disable the lock mechanism based on the indication.

4. The apparatus of claim 1, wherein the scope of access of the compartment comprises one of: no access to the vehicle compartment, one-time temporary access to the vehicle compartment, or unlimited access to the vehicle compartment.

5. The apparatus of claim 3, wherein the request includes a vehicle identifier of the vehicle and a requester identifier of the requester,
    wherein the access token includes the vehicle identifier of the vehicle and the requester identifier.

6. The apparatus of claim 3, wherein the scope of access includes an expiration time of the access token; and
   wherein the disabling of the lock mechanism is based on a current time preceding the expiration time.

7. The apparatus of claim 3, wherein the scope of access includes a sequence number,
   wherein the disabling of the lock mechanism is based on the sequence number being higher than a reference sequence number stored at an access control module, and
   wherein the hardware processor is configured to execute the set of instructions to: update the reference sequence number based on the sequence number after the lock mechanism is enabled.

8. The apparatus of claim 3, wherein the access token includes a vehicle identifier; and
   wherein the disabling of the lock mechanism is based on the vehicle identifier of the access token matching a reference vehicle identifier of the vehicle.

9. The apparatus of claim 3, wherein the hardware processor is configured to execute the set of instructions to: transmit, by a management server to an access control module, an access token indicating the scope of access,
   wherein the access token is signed by a private management key of the management server, and
   verify, by the access control module, a signature of the access token using a public management key of the management server.

10. The apparatus of claim 9, wherein the access token is also encrypted by a public key of the access control module; and
    wherein the access control module decrypts the access token using a private key of the access control module after verifying the signature.

* * * * *